United States Patent
Ziessler et al.

(10) Patent No.: US 9,933,839 B2
(45) Date of Patent: Apr. 3, 2018

(54) COMPUTER SYSTEM AND METHOD OF OPERATING A COMPUTER SYSTEM

(71) Applicant: Fujitsu Technology Solutions Intellectual Property GmbH, München (DE)

(72) Inventors: Thorsten Ziessler, Geisenfeld (DE); Sergej Beljaev, Augsburg (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 659 days.

(21) Appl. No.: 14/412,563

(22) PCT Filed: Jul. 1, 2013

(86) PCT No.: PCT/EP2013/063831
§ 371 (c)(1),
(2) Date: Jan. 2, 2015

(87) PCT Pub. No.: WO2014/005995
PCT Pub. Date: Jan. 9, 2014

(65) Prior Publication Data
US 2015/0199001 A1   Jul. 16, 2015

(30) Foreign Application Priority Data
Jul. 4, 2012   (DE) .................. 10 2012 105 986

(51) Int. Cl.
G06F 1/32   (2006.01)
G06F 1/26   (2006.01)
(Continued)

(52) U.S. Cl.
CPC .............. *G06F 1/3287* (2013.01); *G06F 1/30* (2013.01); *G06F 1/3203* (2013.01);
(Continued)

(58) Field of Classification Search
CPC ..................................... G06F 1/32; G06F 1/26
See application file for complete search history.

(56) References Cited

U.S. PATENT DOCUMENTS

| 4,975,592 A | 12/1990 | Hahn et al. |
| 2002/0108064 A1* | 8/2002 | Nunally ................ G06F 1/3203 713/300 |

(Continued)

FOREIGN PATENT DOCUMENTS

| DE | 20 2011 000 745 | 1/2012 |
| EP | 1 321 845 | 6/2003 |

(Continued)

OTHER PUBLICATIONS

Japanese Office Action dated Jan. 5, 2016 of corresponding Japanese Application No. 2015-512088, along with an English translation.

(Continued)

*Primary Examiner* — Phil Nguyen
(74) *Attorney, Agent, or Firm* — DLA Piper LLP (US)

(57) ABSTRACT

A computer system includes a power supply unit, a system component including at least one processor, a microcontroller and a memory functionally connected to the microcontroller and stores information relating to an interruption in at least one operating voltage of the computer system. When at least one secondary standby voltage is applied to the microcontroller and the information relating to an interruption in the primary supply voltage of the computer system is read from the memory, the microcontroller is configured to selectively switch the computer system to a first operating state on the basis of the information which has been read.

16 Claims, 3 Drawing Sheets

(51) Int. Cl.
*G06F 1/00* (2006.01)
*G06F 1/30* (2006.01)

(52) U.S. Cl.
CPC .......... *G06F 1/3243* (2013.01); *G06F 1/3293* (2013.01); *Y02B 60/121* (2013.01); *Y02B 60/1282* (2013.01); *Y02B 60/32* (2013.01)

(56) References Cited

U.S. PATENT DOCUMENTS

| | | | | |
|---|---|---|---|---|
| 2003/0088800 | A1* | 5/2003 | Cai | G06F 1/3203 713/320 |
| 2005/0278559 | A1* | 12/2005 | Sutardja | G06F 1/3203 713/320 |
| 2008/0168285 | A1* | 7/2008 | de Cesare | G06F 1/3203 713/320 |
| 2008/0182630 | A1* | 7/2008 | Parks | G06F 1/3293 455/574 |
| 2008/0201594 | A1* | 8/2008 | Narushima | G06F 1/266 713/324 |
| 2008/0229125 | A1* | 9/2008 | Lin | G06F 1/3203 713/300 |
| 2009/0207423 | A1 | 8/2009 | Shimizu et al. | |
| 2010/0185833 | A1* | 7/2010 | Saito | G06F 1/3203 712/203 |
| 2012/0042184 | A1 | 2/2012 | Yeh et al. | |
| 2012/0117364 | A1 | 5/2012 | Rosenquist et al. | |
| 2012/0173896 | A1* | 7/2012 | Tanaka | G03G 15/5004 713/300 |

FOREIGN PATENT DOCUMENTS

| | | |
|---|---|---|
| JP | 01-283033 | 11/1989 |
| JP | 05-103936 | 4/1993 |
| JP | 2000-155601 | 6/2000 |
| JP | 3168471 | 5/2001 |
| JP | 2002-123338 | 4/2002 |
| JP | 2010-0044793 | 2/2010 |

OTHER PUBLICATIONS

Industriestandard, "Advanced Configuration and Power Interface Specification," ACPI, Stand 6, Dec. 2011, pp. 31-45.

* cited by examiner

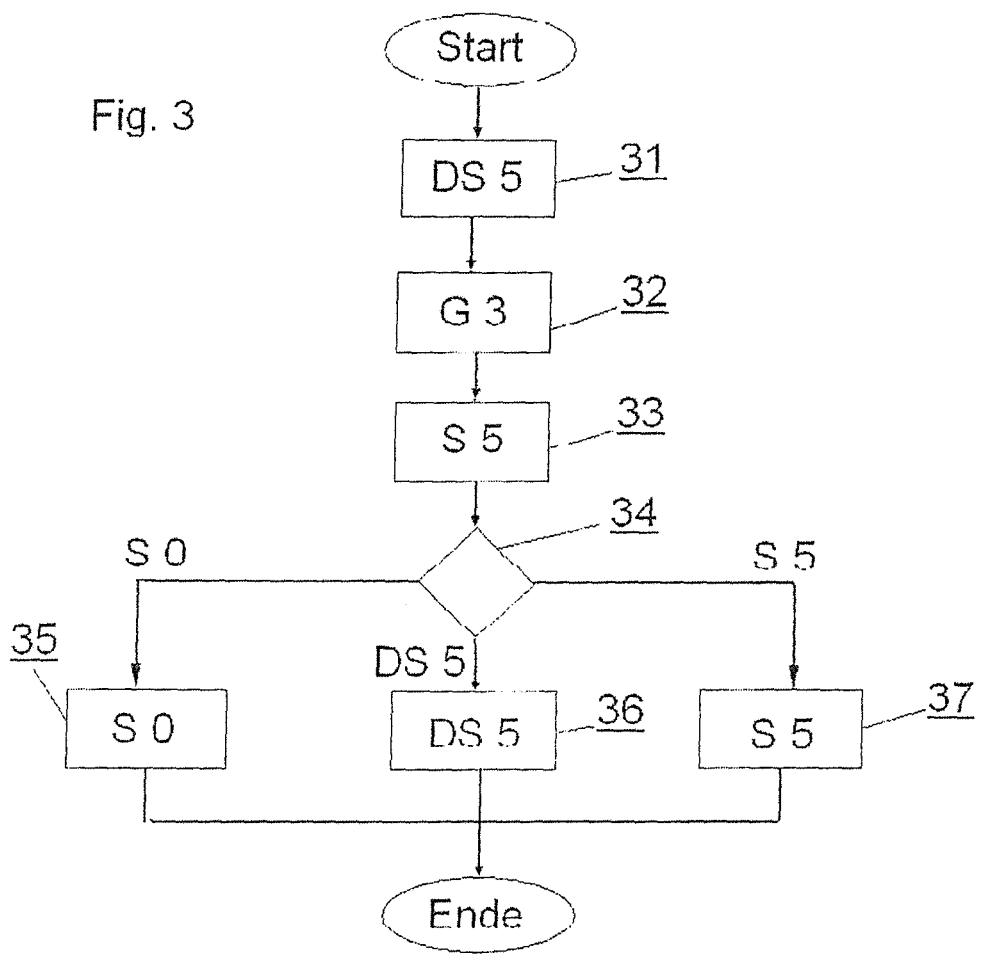

COMPUTER SYSTEM AND METHOD OF OPERATING A COMPUTER SYSTEM

TECHNICAL DISCLOSURE

This disclosure relates to a computer system having a power supply unit that converts a primary supply voltage into at least one secondary operating voltage and at least one secondary standby voltage and a system component comprising at least one processor. The computer system is configured, in a first operating state, to supply the at least one secondary operating voltage to the at least one processor.

BACKGROUND

The industry standard "Advanced Configuration and Power Interface Specification", ACPI for short (status as of 6 Dec. 2011) which was developed by Hewlett Packard Corporation, Intel Corporation, Microsoft Corporation, Phoenix Technologies Ltd. and Toshiba Corporation is well known and describes inter alia various operating states of a computer system. For instance, the state S0 designates an operating state, the states S1 to S4 designate various dormant states of the system and the state S5 designates a so-called "soft-off" or standby state. By assuming a state with a low power consumption such as e.g. the dormant states or the standby state, it is possible for the computer system to save energy.

There is nonetheless a need to provide a computer system whose energy efficiency is still further improved over known systems.

SUMMARY

We provide a computer system including: a power supply unit that converts a primary supply voltage into at least one secondary operating voltage and at least one secondary standby voltage; a system component comprising at least one processor; a microcontroller; and a memory functionally connected to the microcontroller which stores information relating to an interruption in at least one operating voltage of the computer system; wherein the computer system is configured, in a first operating state, to supply the at least one secondary operating voltage to the at least one processor; the computer system is further configured, in a second operating state, to disconnect the at least one processor from the at least one secondary operating voltage and supply the at least one secondary standby voltage to the microcontroller; the computer system is further configured, in a third operating state, to disconnect the at least one processor from the at least one secondary operating voltage and disconnect the microcontroller from the at least one secondary standby voltage, and when the at least one secondary standby voltage is applied to the microcontroller, the microcontroller is configured to read the information relating to the interruption in the at least one operating voltage of the computer system from the memory and selectively switch the computer system to the first operating state on the basis of the information which has been read.

We also provide a method of operating a computer system, comprising at least one processor, a microcontroller and a memory, wherein the computer system is configured, in a first operating state, to supply at least one secondary operating voltage to the at least one processor, is configured, in a second operating state, to disconnect the at least one processor from the at least one secondary operating voltage and supply at least one secondary standby voltage to the microcontroller, and is configured, in a third operating state, to disconnect the at least one processor from the at least one secondary operating voltage and disconnect the microcontroller from the at least one secondary standby voltage, wherein the method includes: storing information relating to an interruption in at least one operating voltage of the computer system; recognizing that at least one secondary standby voltage has been applied to the microcontroller; the microcontroller reading the information relating to the interruption in the at least one operating voltage of the computer system, and selectively switching the computer system to the first operating state on the basis of the information read from the memory by the microcontroller.

BRIEF DESCRIPTION OF THE DRAWINGS

FIG. 3 shows a flow diagram of a start-up procedure of a computer system in accordance with one example.

Figure 1:
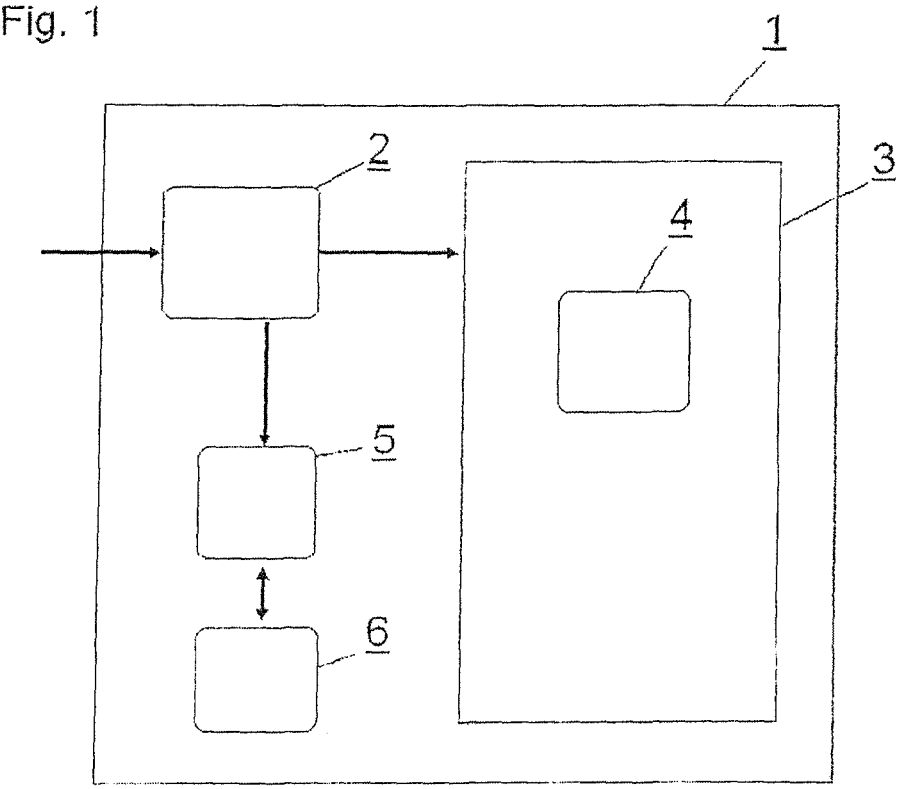
FIG. 1 shows a block diagram of a computer system.

LIST OF REFERENCE NUMERALS 1 computer system
2 power supply unit
3 system component
4 processor
5 microcontroller
6 memory
21-28 method steps
31-37 method steps
S0 fully functional operating state
S5 standby state
DS5 deep sleep state
G3 mechanically switched-off state

DETAILED DESCRIPTION

Our computer system comprises a power supply unit that converts a primary supply voltage into at least one secondary operating voltage and at least one secondary standby voltage, a system component comprising at least one processor, a microcontroller and a memory functionally connected to the microcontroller and intended to store information relating to an interruption in at least one operating voltage of the computer system. The computer system is configured, in a first operating state, to supply the at least one secondary operating voltage to the at least one processor. Furthermore, the computer system is configured, in a second operating state, to disconnect the at least one processor from the at least one secondary operating voltage and supply the at least one secondary standby voltage to the microcontroller. In a third operating state, the computer system is configured both to disconnect the at least one processor and the microcontroller from the operating voltage and the standby voltage respectively. When the at least one secondary standby voltage is applied to the microcontroller, the microcontroller is configured to read the information relating to the interruption in at least one operating voltage of the computer system from the memory and for selectively switching the computer system to the first operating state on the basis of the information which has been read.

By virtue of the microcontroller reading the information relating to the interruption in at least one operating voltage of the computer system, it becomes possible to determine different reasons for interruption of a primary supply voltage, the secondary operating voltage and/or the secondary standby voltage. As a result, when a standby voltage is reapplied it is possible to dispense with an optionally unnecessary supply of current to the processor in the first operating state. By avoiding the start-up of the processor, e.g. to execute BIOS program code to select an operating state for the computer system, energy saving is achieved.

Advantageously, the memory comprises a bistable trigger circuit to which a conservation voltage is supplied by the power supply unit in the first, second and third operating sate. A first state of the bistable trigger circuit indicates that the computer system has experienced an interruption in the secondary standby voltage. An advantage of this design is that it can be implemented in a simple manner with the aid of a discrete circuit.

It is also provided that upon an interruption in a conservation voltage, the bistable trigger circuit assumes a predetermined second state, wherein the second state of the bistable trigger circuit indicates that the computer system has experienced an interruption in the primary supply voltage. As a result, it is possible for the microcontroller to recognise an interruption in the primary supply as such and to differentiate it from an intended interruption in the secondary standby voltage of the microcontroller.

Alternatively, the memory is a non-volatile memory such as e.g. a flash memory or an EEPROM memory and is thus capable of storing information even after an interruption in the primary operating voltage or during some other loss of power.

Further advantageously, the computer system further comprises a non-volatile memory chip to store executable program code. The program code thereby comprises a routine that selects one of a plurality of possible operating states of the computer system. With this approach, the system is particularly flexible in the selection of different states.

We also provide a method of operating a computer system, comprising at least one processor, a microcontroller and a memory, wherein the computer system is configured, in a first operating state, to supply the at least one secondary operating voltage to the at least one processor, and is further configured, in a second operating state, to disconnect the at least one processor from the at least one secondary operating voltage and supply the at least one secondary standby voltage to the microcontroller. Furthermore, the computer system is configured to assume a third operating state, in which the at least one processor is disconnected from the at least one secondary operating voltage and the microcontroller is disconnected from the at least one standby voltage. The method comprises at least the steps of:

storing information relating to an interruption in at least one operating voltage of the computer system,
recognizing that at least one secondary standby voltage has been applied to the microcontroller,
the microcontroller reading the information relating to the interruption in at least one operating voltage of the computer system,
the microcontroller selectively switching the computer system to the first operating state on the basis of the information which has been read from the memory.

An advantage of the method resides in differentiating an intended interruption in an operating state from an unintended interruption on the basis of an evaluation of the stored information by the microcontroller, without assuming a first operating state. In comparison to a change to a first operating state, it is possible to save energy by remaining in the second state.

Different examples are described hereinafter with reference to the attached figures.

The block diagram in accordance with FIG. 1 schematically illustrates a computer system 1. In the illustrated example, the computer system 1 comprises a power supply unit 2 and a system component 3. The system component 3 comprises a processor 4. The computer system 1 further comprises a microcontroller 5 and a memory 6. Although the components 5 and 6 are illustrated in FIG. 1 as independent components, they can, of course, also be integrated into the power supply unit 2 or the system component 3.

The power supply unit 2 receives a primary supply voltage in the form of an alternating voltage power supply and converts it into one or several secondary operating voltages. In particular, it generates a first operating voltage for the system component 3 and the processor 4 arranged thereon, and generates a second operating voltage for the microcontroller 5. The second operating voltage is provided by the power supply unit 2 even in a standby state, e.g. the ACPI state S5, and therefore is designated hereinafter as a standby voltage. The microcontroller 5 and the memory 6 connect such that they can exchange data or the microcontroller 5 can store data in the memory 6 and can retrieve data from the memory 6.

For example, the memory 6 is a flip-flop circuit connected to a programmable input/output connection of the microcontroller 5. A voltage is always supplied, i.e. in all operating states, to the flip-flop circuit by the power supply unit 2 or another energy source such as e.g. a so-called BIOS battery to conserve the content of the memory. Alternatively, the memory 6 is designed as a non-volatile memory chip connected to the microcontroller 5 via one or several bus lines.

If the computer system 1 experiences an interruption in the secondary operating voltage and if subsequently a standby voltage is applied to the microcontroller 5, then the microcontroller can recognize the temporary interruption in the operating voltage and reads information relating to the interruption in the operating voltage from the memory 6. An interruption in the operating voltage can be caused e.g. by a desired shutdown of the computer system 1, by pulling the power supply plug or mechanically switching off the power supply unit 2 or a disruption to the primary supply voltage on the power supply side. On the basis of information which has been read, the microcontroller 5 can determine the cause of the interruption and can then selectively switch the computer system 1 to a first or other operating state.

The different operating states may be operating states having a different energy consumption of the computer system 1. For instance, the first operating state, in which an operating voltage is supplied to the entire computer system 1, corresponds to an operating state with a high energy consumption which in the ACPI standard is designated as the S0 state. The second operating state is an operating state of the computer system 1 which in energy terms is more favorable and in which a standby voltage is supplied only to selected components such as e.g. the microcontroller 5 and the memory 6, and other components of the computer system 1 such as the processor 4, are disconnected from an operating voltage. In this state, the standby voltage can also be supplied to further components such as e.g. a network card or a real-time clock, to enable the computer system 1 to wake up from the standby state. This operating state can be e.g. the ACPI state S5. In a further operating state, a so-called "deep sleep" state, outside the stated ACPI specification, almost the entire computer system 1 is disconnected from an operating voltage. A conservation voltage is supplied by the power supply unit 2 only to the memory 6 insofar as it is a volatile memory and, optionally, to a monitoring circuit for a switch-on button.

The memory 6 may comprise a bistable trigger circuit, wherein a state of the bistable trigger circuit indicates that the computer system 1 has experienced an interruption in the primary supply voltage which in the ACPI standard is designated as G3, without this having been initiated by the computer system 1. In this example, the memory 6 connects to the power supply unit 2 and the power supply unit 2 is configured to supply a conservation voltage to the memory 6 in the first operating state, the second operating state and in the third operating state. Upon an interruption in the conservation voltage, the bistable trigger circuit assumes a reset state, wherein the reset state of the bistable trigger circuit indicates that the primary supply of current to the power supply unit 2 has been interrupted.

For example, when the standby voltage is provided a circuit comprising the bistable trigger circuit indicates an interruption in the primary supply voltage ("AC-fail"). The interruption in the primary voltage is recognized e.g. when the secondary operating voltage is no longer present even though the system component 3 has not previously indicated a shutdown or when the supply of voltage to the bistable trigger circuit is no longer present. The first recognition is active in the ACPI state S0 and the second recognition is used for the transitions from the ACPI state S5 or the deep sleep state DS5 to the state G3.

By virtue of the fact that a conservation voltage is supplied to the memory 6 even in the deep sleep state DS5 and the memory 6 stores information relating to an interruption in voltage, it is possible for the microcontroller 5 to make a selection 34 in the operating state S5, which selection allows the computer system 1 to assume one of several stored operating states.

Figure 2:
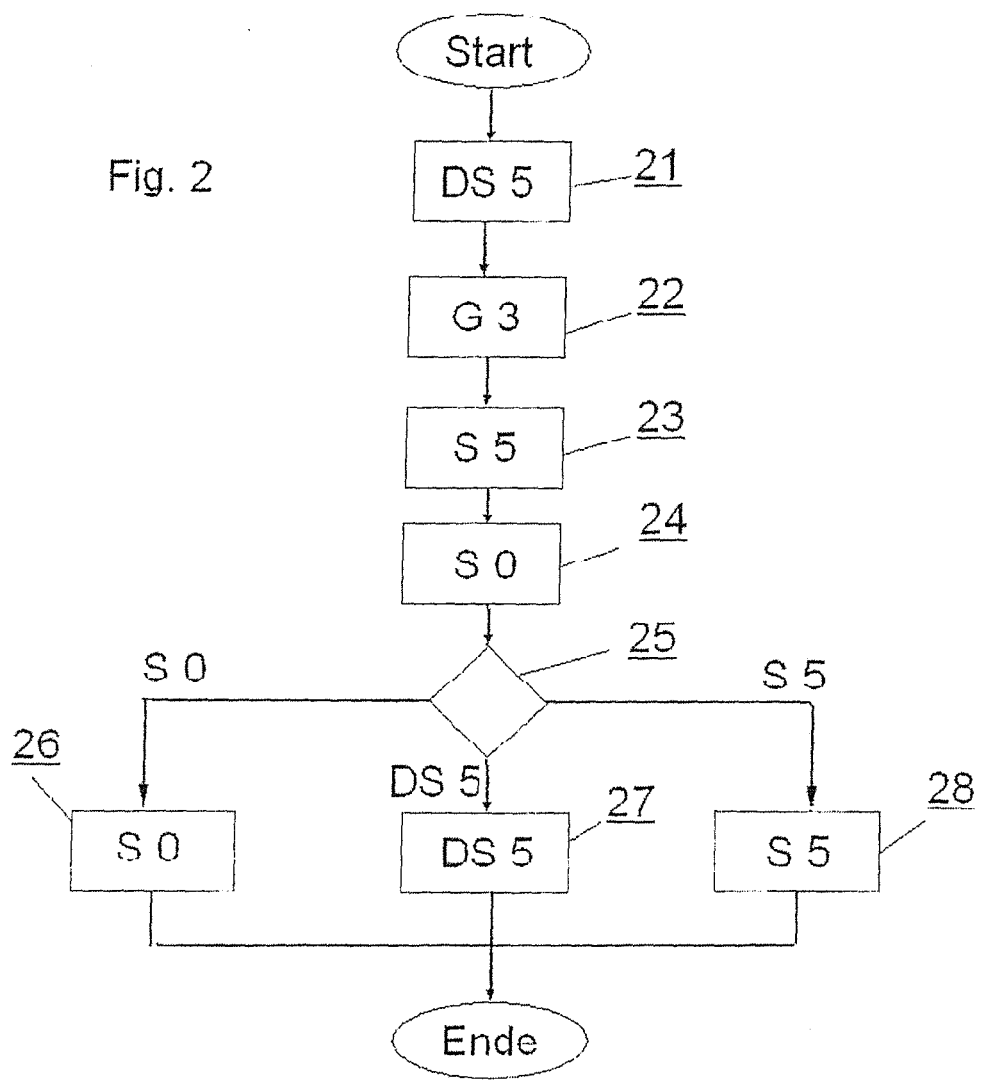
FIG. 2 shows a flow diagram of a possible start-up procedure of a computer system.

To more easily understand our systems and methods, different start-up processes are compared to one another with reference to FIGS. 2 and 3.

The flow diagram illustrated in FIG. 2 describes a possible procedure of the computer system 1 which in a deep sleep state DS5 in step 21 experiences an interruption in the operating voltage. For example, the primary alternating voltage power supply that supplies the power supply unit 2 fails completely. This corresponds to the ACPI state G3 (mechanically off) assumed in step 22. In this case, the power supply unit 2 does not provide either the secondary operating voltage or the secondary standby voltage.

Upon restoration of the primary supply voltage in step 23, only a standby voltage is initially provided for the microcontroller 5. From this standby state, the computer system 1, e.g. in accordance with a BIOS presetting, then assumes in step 24 at least temporarily a fully functional operating state S0 through the provision of the secondary supply voltage of the processor 4.

It is only in a further step 25 in the operating state S0 that it is possible to make a selection relating to the possible operating states and, on the basis of information stored in the storage region of the firmware, to selectively return in step 27 to the deep sleep state DS5. Further options for terminating the method include remaining in a fully functional state S0 in step 26 or changing to the standby state S5 in step 28.

FIG. 3 illustrates the flow diagram of a start-up procedure of a computer system 1 in accordance with one example.

Information relating to an interruption in the at least one supply voltage may have already been previously stored, e.g. in the deep sleep state DS5, in step 31 in a memory 6. Corresponding information can be set e.g. during an intended or unintended interruption in the secondary operating voltages, i.e. the operating voltage of the processor 4, standby voltage, and/or the conservation voltage. Alternatively or in addition, upon restoration of the standby voltage the microcontroller can determine whether there was a command from the system component 3 for an interruption, if the bistable trigger circuit indicates an interruption in the power supply.

In the initial state of the illustrated sequence, in step 31 the computer system 1 is in an energy-saving deep sleep state DS5 and then experiences an interruption in the operating voltage which in step 32 leads to an automatic change to the operating state G3.

After the operating voltage is restored, in step 33 the power supply unit 2 initially only provides the standby voltage for the microcontroller 5. For this purpose, the computer system 1 is initially in so-called "legacy" state which in terms of energy is similar to the S5 state, wherein, however, neither a BIOS code nor an operating system has been loaded by the processor. On the basis of the information contained in the memory 6, the microcontroller 5 can recognize in this energy-saving state that an interruption in a voltage supply has taken place. For example, the content of the memory indicates that an interruption in the secondary operating and standby voltages was intended, e.g. because prior to the interruption a change to the deep sleep state DS5 was signalled by the system component 3. However, during the aforementioned disruption to the primary supply voltage the content of the memory would indicate an unintended interruption.

Accordingly, the microcontroller 5 is then able in step 34 to make an inquiry as to which operating state is the next to be assumed. For example, it is possible to react to an unintended disconnection of the primary supply voltage in accordance with a BIOS presetting. For example, a previously used and stored operating state such as in particular the standby state S5 or the deep sleep state DS5 can be assumed once again. However, during an intended interruption with detection of a subsequent switch-on signal ("power button request"), the operating state S0 is assumed as requested. The microcontroller 5 ensures that the last used or desired state is assumed; e.g. by generating a wake-up event to assume the operating state S0 in step 35, by maintaining the S5 state or by changing to the operating state DS5 in step 36.

The described computer system 1 or the described start-up procedure demonstrate an advantageous combination of, in energy terms, a particularly favourable deep sleep state with a flexible wake-up behavior of the computer when an operating voltage is reapplied.

The invention claimed is:

1. A computer system comprising:
   a power supply unit that converts a primary supply voltage into at least one secondary operating voltage and at least one secondary standby voltage;
   a system component comprising at least one processor;
   a microcontroller; and
   a memory functionally connected to the microcontroller which stores information relating to an interruption in at least one operating voltage of the computer system wherein the content of the memory indicates whether an interruption of the at least one secondary standby voltage was intended or unintended;
   wherein the computer system is configured, in a first operating state, to supply the at least one secondary operating voltage to the at least one processor;

the computer system is further configured, in a second operating state, to disconnect the at least one processor from the at least one secondary operating voltage and supply the at least one secondary standby voltage to the microcontroller;

the computer system is further configured, in a third operating state, to disconnect the at least one processor from the at least one secondary operating voltage and disconnect the microcontroller from the at least one secondary standby voltage, and when the at least one secondary standby voltage is applied to the microcontroller, the microcontroller is configured to read the information relating to the interruption in the at least one operating voltage of the computer system from the memory and, in an intended interruption, to switch the computer system to the first operating state upon detection of a subsequent start-up signal and perform an inquiry in an unintended interruption as to which operating state is the next to be assumed.

2. The computer system according to claim 1, wherein the first operating state corresponds to an active state having a first power consumption, the second operating state corresponds to a standby state having a second power consumption which is reduced compared to the first power consumption, and the third operating state corresponds to a deep sleep state having a third power consumption which is reduced compared to the second power consumption.

3. The computer system according to claim 1, wherein the memory comprises a bistable trigger circuit to which a conservation voltage is supplied by the power supply unit in the first, second and third operating state, and a first state of the bistable trigger circuit indicates that the computer system has experienced an interruption in the secondary standby voltage.

4. The computer system according to claim 2, wherein, upon an interruption in the conservation voltage, the bistable trigger circuit assumes a predetermined second state, and the second state of the bistable trigger circuit indicates that the computer system has experienced an interruption in the primary supply voltage.

5. The computer system according to claim 1, wherein the memory is a non-volatile flash memory or an EEPROM memory.

6. The computer system according to claim 1, further comprising a non-volatile memory chip that stores executable program code, and the program code comprises a routine that selects one of a plurality of possible operating states of the computer system.

7. A method of operating a computer system, comprising at least one processor, a microcontroller and a memory, wherein the content of the memory indicates if an interruption of the at least one secondary standby voltage was intended or unintended and the computer system is configured, in a first operating state, to supply at least one secondary operating voltage to the at least one processor, is configured, in a second operating state, to disconnect the at least one processor from the at least one secondary operating voltage and supply at least one secondary standby voltage to the microcontroller, and is configured, in a third operating state, to disconnect the at least one processor from the at least one secondary operating voltage and disconnect the microcontroller from the at least one secondary standby voltage, wherein the method comprises:

storing information relating to an interruption in at least one operating voltage of the computer system;

recognizing that at least one secondary standby voltage has been applied to the microcontroller;

the microcontroller reading the information relating to the interruption in the at least one operating voltage of the computer system, switching, in an intended interruption, the computer system to the first operating state upon detection of a subsequent start-up signal, and performing, in an unintended interruption, an inquiry as to which operating state is the next to be assumed.

8. The computer system according to claim 2, wherein the memory comprises a bistable trigger circuit to which a conservation voltage is supplied by the power supply unit in the first, second and third operating state, and a first state of the bistable trigger circuit indicates that the computer system has experienced an interruption in the secondary standby voltage.

9. The computer system according to claim 2, wherein the memory is a non-volatile flash memory or an EEPROM memory.

10. The computer system according to claim 2, further comprising a non-volatile memory chip that stores executable program code, and the program code comprises a routine that selects one of a plurality of possible operating states of the computer system.

11. The computer system according to claim 3, further comprising a non-volatile memory chip that stores executable program code, and the program code comprises a routine that selects one of a plurality of possible operating states of the computer system.

12. The computer system according to claim 4, further comprising a non-volatile memory chip that stores executable program code, and the program code comprises a routine that selects one of a plurality of possible operating states of the computer system.

13. The computer system according to claim 5, further comprising a non-volatile memory chip that stores executable program code, and the program code comprises a routine that selects one of a plurality of possible operating states of the computer system.

14. A computer system comprising:
a power supply unit that converts a primary supply voltage into at least one secondary operating voltage, at least one secondary standby voltage and a conservation voltage;
a system component comprising at least one processor;
a microcontroller; and
a bistable trigger circuit functionally connected to the microcontroller;
wherein
the computer system is configured, in a first operating state, to supply the at least one secondary operating voltage to the at least one processor;
the computer system is further configured, in a second operating state, to disconnect the at least one processor from the at least one secondary operating voltage and supply the at least one secondary standby voltage to the microcontroller;
the computer system is further configured, in a third operating state, to disconnect the at least one processor from the at least one secondary operating voltage and disconnect the microcontroller from the at least one secondary standby voltage, the computer system is further configured to supply the conservation voltage to the bistable trigger circuit in the first, second and third operating state; and upon an interruption in the conservation voltage, the bistable trigger circuit assumes a predetermined second state, wherein the second state of the bistable trigger circuit indicates that the computer system has experienced an unintended interruption in the primary supply voltage.

15. The computer system according to claim 14, wherein a first state of the bistable trigger circuit indicates that the computer system has experienced an intended interruption in the secondary standby voltage and the microcontroller is arranged to differentiate an unintended interruption in the primary supply voltage from an intended interruption in the secondary standby voltage of the microcontroller.

16. The computer system according to claim 15, wherein the microcontroller, when the at least one secondary standby voltage is applied to the microcontroller, is configured to switch, in an intended interruption, the computer system to the first operating state upon detection of a subsequent start-up signal and to perform an inquiry, in an unintended interruption, as to which operating state is the next to be assumed.

* * * * *

UNITED STATES PATENT AND TRADEMARK OFFICE
CERTIFICATE OF CORRECTION

PATENT NO. : 9,933,839 B2
APPLICATION NO. : 14/412563
DATED : April 3, 2018
INVENTOR(S) : Ziessler et al.

Page 1 of 1

It is certified that error appears in the above-identified patent and that said Letters Patent is hereby corrected as shown below:

In the Claims

At Column 7, Line 39 (Claim 4), please change "claim 2" to --claim 3--.

Signed and Sealed this
Fourteenth Day of August, 2018

Andrei Iancu
*Director of the United States Patent and Trademark Office*